United States Patent
Nordin (10) Patent No.: US 7,653,222 B2
(45) Date of Patent: Jan. 26, 2010

(54) METHOD AND DEVICE FOR IDENTITY CHECK USING FREQUENCY ANALYSIS

(75) Inventor: Björn Nordin, Lund (SE)

(73) Assignee: Precise Biometrics AB, Lund (SE)

( * ) Notice: Subject to any disclaimer, the term of this patent is extended or adjusted under 35 U.S.C. 154(b) by 610 days.

(21) Appl. No.: 10/513,400

(22) PCT Filed: May 7, 2003

(86) PCT No.: PCT/SE03/00729

§ 371 (c)(1),
(2), (4) Date: Dec. 16, 2004

(87) PCT Pub. No.: WO03/096263

PCT Pub. Date: Nov. 20, 2003

(65) Prior Publication Data

US 2005/0175223 A1    Aug. 11, 2005

(30) Foreign Application Priority Data

May 7, 2002    (SE) .................................. 0201366

(51) Int. Cl.
*G06K 9/00* (2006.01)
(52) U.S. Cl. ..................................................... 382/124
(58) Field of Classification Search ........................ None
See application file for complete search history.

(56) References Cited

U.S. PATENT DOCUMENTS

| | | | |
|---|---|---|---|
| 4,805,223 A | 2/1989 | Denyer | |
| 5,426,708 A | 6/1995 | Hamada et al. | |
| 5,761,330 A | 6/1998 | Stoianov et al. | |
| 7,099,495 B2 * | 8/2006 | Kodno et al. | ................. 382/117 |

FOREIGN PATENT DOCUMENTS

| | | |
|---|---|---|
| DE | 42 20 971 A1 | 1/1993 |
| DE | 199 29 671 A1 | 1/2001 |
| EP | 0 329 166 | 8/1989 |
| EP | 0 778 541 | 6/1997 |
| WO | WO 99/04358 | 1/1999 |
| WO | WO 01/84494 | 11/2001 |

* cited by examiner

*Primary Examiner*—Brian P Werner
*Assistant Examiner*—Elisa M Rice
(74) *Attorney, Agent, or Firm*—Buchanan Ingersoll & Rooney PC (57) ABSTRACT

In a method for use in checking a person's identity, at least part of an image of a fingerprint from the person is transformed so that a representation of a frequency content in said part of the image is obtained. Based on the obtained representation of the frequency content, a frequency code is determined, which contains a predetermined number of frequency code values. A device for carrying out the method is also described.

25 Claims, 4 Drawing Sheets

METHOD AND DEVICE FOR IDENTITY CHECK USING FREQUENCY ANALYSIS

FIELD OF THE INVENTION

The present invention relates to a method and a device for use in checking a person's identity.

BACKGROUND ART

It is known to use fingerprints for checking a person's identity. In such a check, current data from a current fingerprint from the person whose identity is to be checked is compared with previously recorded reference fingerprint data (below sometimes only called reference data) for one or more persons.

If the check concerns a verification of the person's identity, the current data from the current fingerprint is compared only with reference data for the person who the person whose identity is to be checked pretends to be.

If the check concerns an identification of the person's identity, the current data is compared with reference data for at least two, but usually several, different persons to determine whether the current fingerprint originates from any of these persons.

Reference fingerprint data for a plurality of persons can be stored in a local database for an individual fingerprint checking system or in a central database for a plurality of checking systems. Alternatively, reference data for a person can be stored in a personal unit, such as a personal memory card or smart card, which the person uses when he or she wants to authenticate himself/herself, i.e. prove his/her identity by verification or identification.

In some types of storing units there may be a limited storage capacity. In such cases it is desirable to have a small amount of reference data.

The comparison between reference data and current data can be made either in the same physical unit as the one in which the reference data is stored, in the same physical unit as records and processes the current fingerprint or in some other unit.

If the comparison is made in a unit with a limited processor capacity, it is desirable that the comparison between current data and reference data can be made in a simple way. If either current data or reference data has to be transferred from one unit to another in connection with the comparison, it is desirable for the amount of data to be small so that the transfer time will be short.

In many applications, the user wants to be able to authenticate himself and get access to a protected object without delay. Then it is desirable that the current data can be generated quickly, that the transfer time, if any, is short and that the comparison can be made quickly.

The reference data can correspond to a complete fingerprint as recorded. However, only part of the information in the fingerprint is usually saved as reference data.

For instance, it is known to save as reference data information about specific features, also referred to as minutiae points, in the fingerprint. These specific features are usually of two predetermined types, viz. fingerprint ridge endings and fingerprint ridge bifurcations. For instance, coordinates for where these features are placed can be saved as reference data. When checking a person's identity, the relative location of features in a current fingerprint is determined and then compared with the relative location of the features in the reference data.

From, for instance, WO 01/84494 it is also known to save as reference data partial areas of an image of a reference fingerprint. When checking a person's identity, corresponding partial areas are found in a current fingerprint and then compared with the partial areas in the reference data. To allow the final identity check to be carried out on a smart card with a limited processor and memory capacity, a partial area is stored as a so-called public partial area in a public part of the reference data on the smart card. In the identity check, this public partial area is read to a computer unit, in which it is compared with a current fingerprint to determine in which position in relation to this the public partial area fits best. In this way, the reference data is aligned with the current fingerprint. In the public part of the reference data, also coordinates for how other partial areas, so-called private partial areas, are placed in relation to the public partial area are stored. When the current fingerprint has been aligned with the reference data, these coordinates can be used to determine which partial areas in the current image are to be selected and sent to the smart card for comparison with the private partial areas.

It is further known to form a finger code by first finding an objective reference point in a fingerprint, then dividing the fingerprint into sectors in relation to the reference point, then Gabor filtering the image with a number of Gabor filters and finally calculating the finger code as the variance in each sector of the Gabor-filtered image. The obtained finger code is advantageous as reference data since it will be quick and easy to compare a reference finger code with a current finger code. However, it takes relatively long to find the finger code. Another problem is that it is based on the fact that an objective reference point can be established in the fingerprint merely by searching in the same. It is known, however, that for certain fingerprints it is difficult, not to say impossible, to establish such an objective reference point.

SUMMARY OF THE INVENTION

An object of the invention is to provide a method and a device for use in checking a person's identity, which method and which device make it possible to wholly or partly satisfy one or more of the above desiderata as regards storage space, transfer time, comparison time and time for generating data.

More specifically, according to the invention, a method is provided for use in checking a person's identity, comprising the steps of transforming at least part of an image of a fingerprint from the person so that a representation of a frequency content in said part of the image is obtained, and based on the obtained representation of the frequency content, determining a frequency code which contains a predetermined number of frequency code values.

There are techniques, for instance Fourier transforming, which make it possible to quickly transform an image so that a representation of the frequency content in the image is obtained. Based on this representation, a frequency code can be determined relatively quickly and easily. It is also possible to generate reference data and current data in a time which is acceptably short for many applications.

Depending on how many frequency code values the frequency code contains and how the frequency code values are defined, it is possible to produce reference data and current data requiring a small storage space and short transfer time, but still giving a probability of error which is acceptably low for many applications regarding errors of type 1 (that a current fingerprint from the same person and finger as those from which the reference data is fetched is not accepted) and of type 2 (that a current fingerprint from another person or another finger than the one from which the reference data is fetched is accepted).

As mentioned above, the method according to the invention is intended for use when checking a person's identity. This may comprise, for instance, that the method is used for producing reference fingerprint data for a person, for producing current fingerprint data or for checking a person's identity.

The image can be a grey-scale image, a binary image or a colour image. It shows a fingerprint by representing ridges and valleys in the fingerprint with different intensities. The image may comprise a complete fingerprint or a partial fingerprint depending on the size of the sensor that has been used to record the image.

By the image or part of this being transformed is here meant that a mathematically defined transform is allowed to operate on the image and convert the information in the image into a representation of the frequency content, i.e. with which frequencies it is possible to describe the intensity variations in the image in different directions and the mutual relationship thereof.

In some cases, it may be desirable to transform only part of the fingerprint image. It may be desirable, for instance, to exclude the background or parts where the fingerprint is of poor quality, it may be desirable to use only an area round a certain point, or it may for some other reason be desirable to select only a part to be transformed.

The frequency code contains a predetermined number of frequency code values. The number of values in the code can be determined from the desired size of the reference data and the desired probability of error of types 1 and 2. A greater number of values requires a greater storage capacity for the reference data, but normally gives lower probability of error.

The transform can be, for instance, one, or a combination, of the following transforms: Fourier transforms, Cosinus transforms, Bessel transforms or Hadamard transforms. An advantage of these transforms is that they are to some extent insensitive to lateral displacements of a finger on a sensor as long as the same part of the finger is located on the sensor.

The frequency code values are determined based on the obtained representation of the frequency content. More specifically, they can be determined based on a predetermined number of frequency values that are selected from the representation of the frequency content, in which case each frequency value may be a measure of the existence of a corresponding frequency in a certain direction in the image that is transformed. One or more frequency values can be used to produce a frequency code value. A plurality of frequency values can, for instance, be averaged or weighted together to determine a frequency code value.

The method according to the invention can be accomplished by means of a computer program. The computer program can be stored on a storage medium, for instance in a memory of electronic, optical, magnetic or some other known type. The storage medium can also be a propagating signal.

According to another aspect of the invention, a device is provided for use in checking a person's identity, comprising a signal processor, which is adapted to transform at least part of an image of a fingerprint from the person so that a representation of a frequency content in said part of the image is obtained, and based on the obtained representation of the frequency content, determining a frequency code which contains a predetermined number of frequency code values.

The signal processor can be accomplished by means of a suitably programmed general or specially adapted computer. It can alternatively be accomplished with specially adapted hardware, such as an ASIC (Application Specific Integrated Circuit) or with an FPGA (Field Programmable Gate Array) or with analog circuits or digital circuits or with a suitable combination thereof.

BRIEF DESCRIPTION OF THE DRAWINGS

The present invention will now be described in more detail by way of example and with reference to the accompanying drawings, in which.

DETAILED DESCRIPTION OF EMBODIMENTS

Figure 1:
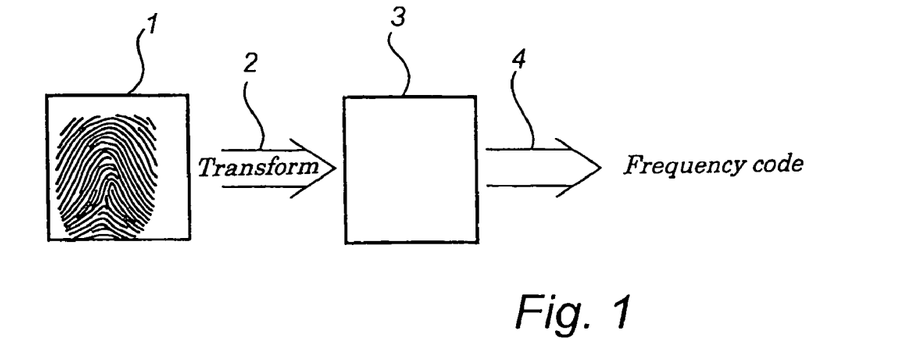
FIG. 1 shows most schematically the basic principle of the present invention.

The present invention is based on the idea of generating a frequency code that can be used when checking a person's identity. This is schematically illustrated in FIG. 1.

First, an image 1 of a fingerprint from a person is recorded. This image represents the information in the fingerprint in the form of intensity variations. The image 1 is transformed 2 so that a representation 3 of the frequency content in the image 1 is obtained instead.

From this frequency representation, a number of frequency values is selected and processed 4 so that they can be represented in a compact way in the form of frequency code values. The frequency code values jointly form a frequency code $C_R$. This frequency code can be stored as reference fingerprint data to be used in a subsequent identity check.

In the identity check, a current frequency code $C_A$ is generated from a current fingerprint and compared with the previously stored reference frequency code $C_R$. If the compared frequency codes are sufficiently equal, the fingerprints from which they are generated will be considered to originate from one and the same finger, and thus the person's identity is ensured.

Figure 2:
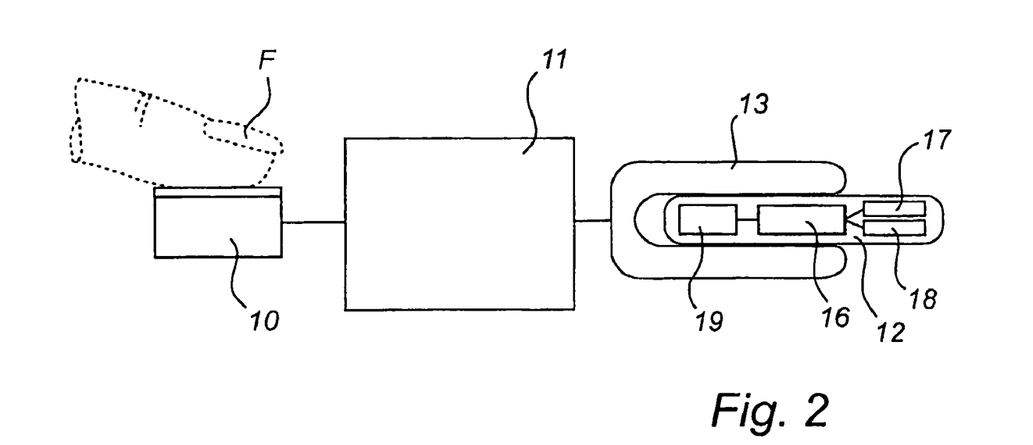
FIG. 2 shows an example of a system in which an identity check by means of frequency codes can be performed.

In the following, an example of a system will be described, in which an identity check by means of frequency codes can be performed. The system comprises, as shown in FIG. 2, a fingerprint sensor 10 for recording fingerprints, a first unit 11, which in the following is called computer unit, for processing fingerprint data, and a second unit 12, which comprises a memory for storing reference fingerprint data and a processor for processing fingerprint data and which in this case consists of a smart card.

The sensor 10 can, but need not, be used both for recording of reference fingerprints and for recording of current fingerprints. It can be optical, capacitive, thermal or be of some other convenient type. It can be an area sensor or a line sensor.

The computer unit 11 can be a common general computer, such as a PC. Alternatively, it can be, for instance, a computer unit 11 which is specially adapted for this application or specially adapted hardware. In this example, it comprises a smart card reader 13, which may be any commercially available smart card reader or a specially designed/adapted smart card reader. The smart card reader 13 may be physically integrated into the computer unit 11 or may be arranged in a casing of its own which in terms of signals is connected or connectible to the rest of the computer unit. There may be one or more processors in the computer unit 11, and the processing of fingerprint data that takes place in the computer unit can be distributed in different ways among different processors.

The smart card 12 can be any type of smart card on which a comparison of fingerprint data is to be carried out. The smart card 12 has a signal processing unit which comprises a processor 16, a memory 17 for storing of reference fingerprint data which is extracted from a reference fingerprint from the smart card holder, and a working memory 18, as well as communication circuits 19 which enable communication between the smart card reader 13 and the smart card 12. The communication circuits 19 can, but need not, require contact between the smart card 12 and the reader 13.

In the following, an example of how the invention can be realised in the system shown in FIG. 2 will be described.

To allow the smart card 12 to be used to verify the smart card holder's identity, reference fingerprint data must be stored in the memory 17 of the smart card. This is preferably carried out under such conditions that it is possible to ensure that it is really the smart card holder's reference fingerprint data that is stored. An example of how the recording of reference fingerprint data is made is shown in the flow chart in FIG. 5.

Figure 3:
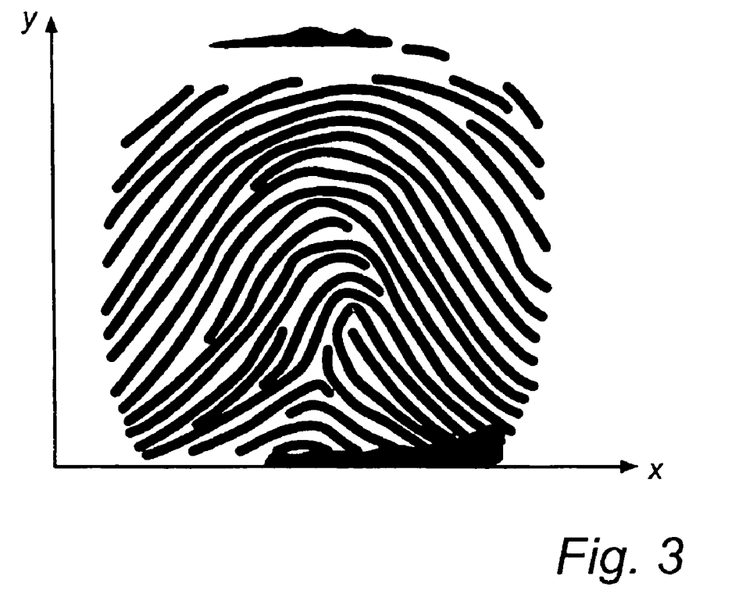
FIG. 3 shows an image of a fingerprint.
Figure 5:
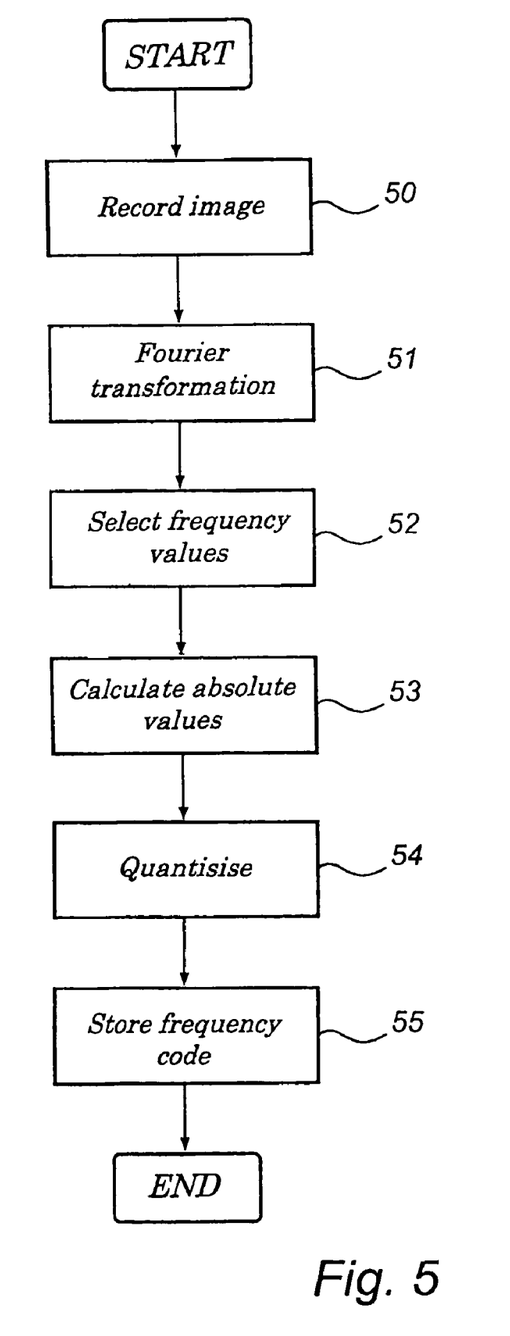
FIG. 5 is a flow chart and shows an example of a method for producing reference fingerprint data.

In a first step 50, an image of the smart card holder's fingerprint is recorded by means of a sensor 10. An example of how a real fingerprint image that has been recorded by means of a capacitive fingerprint sensor is shown in FIG. 3. In the image, the dark lines correspond to ridges in the fingerprint and the light lines to valleys in the fingerprint. The darker portions that are found in the upper and lower edge of the image are caused by remaining layers of fat on the sensor.

The image is read from the sensor 10 into the computer unit 11 where it is Fourier transformed, step 51. The Fourier transformation can be made by means of specially developed software or hardware or by means of commercially available software or hardware. It is normally made by means of calculations based on a mathematical method, but can also be made without calculations using an optical lens and a sensor. Optionally, only part of the image can be selected and transformed.

By the Fourier transformation, frequency values F(u,v) are obtained, which consist of complex numbers with a real part and an imaginary part as follows $$F(u, v) = \frac{1}{MN} \sum_{x=0}^{M-1} \sum_{y=0}^{N-1} f(x, y) \exp\left[-j2\pi\left(\frac{ux}{M} + \frac{vy}{N}\right)\right]$$

where u=0,1,2, . . . , M-1
v=0,1,2, . . . , N-1 and where u and v are Cartesian coordinates in the Fourier transformed image and x and y are Cartesian coordinates in the fingerprint image (FIG. 3).

The frequency values F(u,v) constitute a representation of the frequency content in the fingerprint image.

The frequency content can be illustrated in an image.

Figure 4:
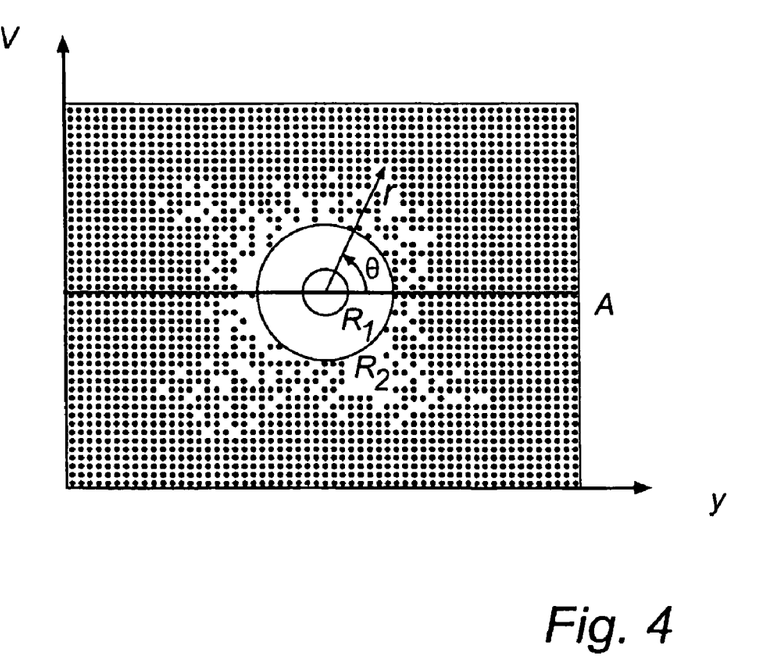
FIG. 4 shows a representation of the frequency content in the fingerprint in FIG. 3.

FIG. 4 shows a Fourier transform of the image in FIG. 3. More specifically, the absolute values of the frequency values F(u,v) are shown. FIG. 4 shows a grey-scale image of what frequencies exist in different directions in the fingerprint in FIG. 3, the frequency increasing as a function of the radius r in FIG. 4, the angle θ from the horizontal axis A in FIG. 4 indicating the direction in FIG. 3 and higher existence of a certain frequency being illustrated in lighter grey-scale in FIG. 4. The representation in FIG. 4 is symmetrical since the frequency content will be the same in directions that differ by 180 degrees.

For each frequency in FIG. 4 there is thus a frequency value which gives a measure of the existence of the frequency in the current direction v. These frequency values are used to generate the frequency code. More specifically, a predetermined number of frequency values is selected, step 52.

FIG. 4 shows all frequencies within a certain frequency range, i.e. also frequencies that are not significant to a fingerprint since they do not at all reflect the closeness of fingerprint lines in different directions in a fingerprint. Therefore the frequency values are selected for frequencies within a limited range in FIG. 4, which range is relevant for fingerprints. In FIG. 4, frequencies are selected in the upper semi-plane in the annular area between the radii $R_1$ and $R_2$.

The relevant range is individual-dependent since different people have different spacings between the fingerprint lines. The frequency values can then be selected either for frequencies within a large predetermined range taking the distribution among different individuals into consideration, or for frequencies within a smaller individual-adapted range. The individual-adapted frequency range is determined as a range in which the individual in question has a high existence of relevant frequencies, i.e. frequencies corresponding to structures in the fingerprint.

For instance, the frequency range can in the former case be selected so as to correspond to 800 to 5000 lines/m.

For determining the frequency code values, either the real parts, the imaginary parts, the absolute values or a combination thereof can be used, for instance phase displacement.

In this example, it is assumed that the absolute values (also called magnitudes) of the selected frequency values are calculated, step 53.

The frequency code C is generated by the sequence of the thus generated frequency code values. Expressed in a different way:

$$C(r,v)=|F(r,\theta)| \text{ where } R_1<r<R_2 \text{ and } 0<v<\pi$$

where F(r,θ) is the frequency value in the point (r,θ) and C(r,θ) is the frequency code value for the same point.

With this terminology, it is thus the frequency code values C(r,θ) that are shown in FIG. 4. Thus it is possible, as an alternative, first to calculate the frequency code values for all points and then select frequency code values for predetermined frequencies as the frequency code values to form to the frequency code.

For the frequency code to be represented in a memory-saving manner, the frequency code values C(r,θ) are then quantized, step 54, for instance to one of the values 0, 1, 2 or 3.

If 800 frequency values are selected, for instance 20 different frequencies for each of the 40 different angles v, a frequency code $C_R$ with 200 byte data will be obtained if the frequency code values are quantized as described above.

The values are stored in a table with 5 bytes in each row. This means that each row contains the quantized frequency code values for an angular value. A change of the frequency code corresponding to a turning of the fingerprint in either direction at an angle of 4.5 degrees can thus easily be achieved. The only thing that need be made is to circular-shift the rows in the table one step in the corresponding direction.

Finally, the frequency code $C_R$ is stored, step 55, as reference fingerprint data on the smart card 12. As will be described in more detail below, the frequency code can be stored as public reference fingerprint data that is allowed to be read from the smart card for use in the computer unit in an identity check, or as private reference fingerprint data that is not allowed to be read from the smart card but is compared with current fingerprint data on the smart card.

Once reference fingerprint data has been stored on the smart card 12, the smart card holder can use the smart card to authenticate himself. An example of how this may be done will be described in the following.

The smart card holder inserts his smart card 12 in the smart card reader 13 and places the same finger on the sensor 1 as was used for recording of reference fingerprint data on the sensor 10.

Figure 6:
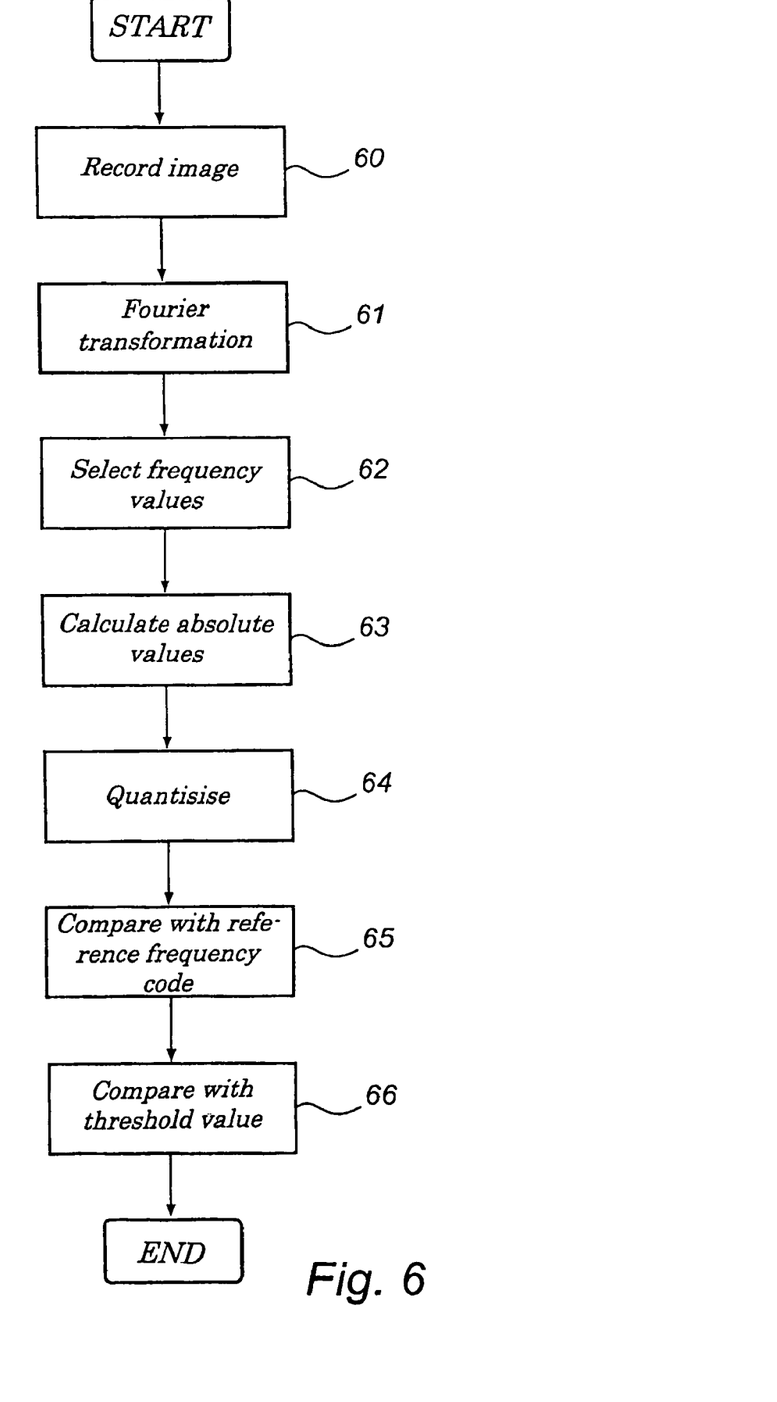
FIG. 6 is a flow chart and shows an example of a method for identity checking.

The sensor 10 records a current image of the smart card holder's fingerprint, step 60 in FIG. 6. The image is read into the computer unit 11 where it is processed in exactly the same way as in the recording of the reference fingerprint data. More specifically, the image is Fourier transformed, step 61, frequency values are selected in the image, step 62, the absolute values of the selected frequency values are calculated, step 63, and the calculated absolute values are quantized, step 64, to form the current frequency code $C_A$.

As an alternative, the frequency values can be selected within a predetermined, individual-independent range. This alternative may be used even if the reference frequency code is based on an individual-dependent range since in that case a greater current frequency code can be sent to the smart card and a suitable subset of the current frequency code can be selected on the smart card based on data stored there regarding on what frequency range the reference frequency code is based.

As another alternative, the frequency values can be selected individual dependent. The frequency range may then be selected depending on where in the representation of the frequency content in the current fingerprint the individual has high existences of frequencies. Alternatively, the frequency range may be selected based on data about this that is sent from the smart card.

The current frequency code $C_A$ is sent to the smart card 12 where it is compared, step 65, with the previously stored reference frequency code $C_R$. The comparison is made by determining the absolute difference between frequency code values corresponding to each other. The total difference is then compared, step 66, with a threshold value to determine whether a similarity condition is satisfied and whether the reference frequency code $C_R$ and the current frequency code $C_A$ can thus be considered to originate from one and the same finger.

In the recording of the current fingerprint it may happen that the person in question places his finger at a different angle on the sensor compared with the recording of the reference fingerprint. This will affect the frequency code by the representation of the frequency content being rotated. The frequency code values will thus be in a different order in the frequency code. In the identity check, this can be taken into consideration by repeating the comparison between the current frequency code and the reference frequency code with a mutual permutation of the frequency code values, step 67. The mutual permutation can be effected in various ways; the processor on the smart card can permute the values either in the reference frequency code or in the current frequency code so that the permutation corresponds to a certain degree of rotation or, alternatively, the reference frequency code can be stored on the smart card in different versions with the frequency code values permuted. As another alternative, the computer unit 11 can generate different versions of the current frequency code and send them to the smart card for comparison.

In the case when several comparisons are made, the criterion for identifying a person will be that one of the permutations satisfies the similarity criterion.

However, the permutation need not always be effected. Some fingerprint sensors have different control means which command the user to always place his finger in the same position on the sensor. When using such a fingerprint sensor, the frequency code thus need not be permuted.

It may also happen that the user when recording the current fingerprint places his finger in the same rotational position on the sensor but in a translated position. Since the frequency code is based on the frequency content, which is a global property of the fingerprint, the translation will have a smaller effect on the frequency code compared with the case of using minutiae points and partial areas representing local properties in the fingerprint.

An embodiment has been described above where the current frequency code is generated in the computer unit and then compared with a reference frequency code on the smart card. In this case, the reference frequency code never leaves the smart card and therefore constitutes private reference fingerprint data.

However, it is also conceivable to use the reference frequency code as public reference fingerprint data which is allowed to be read from the smart card for use in the computer unit for alignment of the current fingerprint image with the private reference fingerprint data so that the final comparison between current fingerprint data and reference fingerprint data will be easier and quicker to perform.

More specifically, in this case the reference fingerprint code is thus stored as public reference data. If the reference fingerprint code is based on the absolute values of the frequency values, alignment can only be made in the rotational direction. On the other hand, if the reference fingerprint code contains both quantized real parts and quantized imaginary parts of the frequency values, alignment may however also be made in the translational direction.

Moreover, other fingerprint data is stored as private reference data on the smart card. This other fingerprint data may consist of a fingerprint code which is based on other points in the representation of the frequency content, partial areas of the reference fingerprint image, minutiae points from the reference fingerprint image or some other fingerprint data which is determined from the reference fingerprint image.

In the identity check, a current image of the fingerprint from the person whose identity is to be checked is recorded in the same way as before. The current image is Fourier transformed as described above. The computer unit further reads the public reference fingerprint data from the smart card, i.e. in this case the reference frequency code $C_R(r,\theta)$. Each complex value of the Fourier transform is then multiplied by the corresponding complex value in the reference frequency code $C_R(r,\theta)$ as follows $$G(r,\theta)=F(r,\theta)*C_R(r,\theta).$$

According to the correlation theorem, this multiplication corresponds to a correlation of two images in the spatial plane.

After that $G(r,\theta)$ is inverse Fourier transformed back to the spatial plane to g. The coordinates for the maximum value of g then immediately corresponds to the relative translation between the reference fingerprint image and the current fingerprint image. If these are not displaced in relation to each other, the maximum value of g would thus be in the centre of g.

The rotation between the current image and the reference image can further be determined by permutation of the reference frequency code and a current frequency code which is generated from the Fourier transform in the same way as described above. Once the rotation and the translation have been determined, the current fingerprint image and the reference fingerprint image have thus been aligned with each other. Starting from the alignment, data from the current image can be more easily compared with reference data on the smart card.

If the private reference data consists of partial areas, the current partial areas can be determined after the alignment has been made by means of the frequency code. If the private reference data consists of minutiae points, coordinates for these can be determined in the coordinate system of the reference data after alignment by means of the frequency code.

As a further alternative, comparison by means of the frequency code can be carried out supplementing a comparison between some other type of fingerprint data. Since the frequency code reflects a global property of the fingerprint, it may be convenient to make a supplementary comparison of a local property, for instance minutiae points or partial areas. This should increase safety in the authentication. The criterion for the current person's identity to be considered authenticated can be that an authentication threshold value should be achieved separately for both comparisons of the fingerprint data or be achieved for only one comparison. Alternatively, it is possible to use some kind of criterion which is based on a weighting of the authentication threshold values for both comparisons.

An embodiment has been described above where the frequency code is generated in a computer unit and where the comparison takes place on a smart card. It is possible, however, to realise the invention by means of some other pair of a first and a second unit. The first unit may be, for instance, a PC of an Internet customer and the second unit a computer of a service provider which stores the reference fingerprint data under safe conditions. As a further example, the first unit may consist of a mobile phone and the second unit of a SIM card or the like in the mobile phone. It is also conceivable that the method can be realised wholly or partly in some other type of portable unit, such as a PDA, a pen provided with a processor, or an access protected hard disk.

It is alternatively conceivable to carry out the method described above by determining a current frequency code and comparing the current frequency code with a reference code in one and the same unit.

A further conceivable application is to use the frequency code in identification. The current frequency code is then compared with reference frequency codes for a number of people. The purpose is then to select in a first step a small number of the people as candidates for additional comparison. The additional comparison can then be made by means of some other type of reference fingerprint data, for example minutiae points or partial areas.

The invention claimed is:

1. A method for use in checking a person's identity in a unit having a processor, comprising the steps of:
    transforming by said processor at least part of an image of a fingerprint from the person so that a representation of a frequency content in said part of the image is obtained;
    selecting by said processor, from the representation of the frequency content, a predetermined number of frequency values, wherein said selecting is made for frequencies within a smaller individual-adapted range such that said frequencies correspond to spacing between fingerprint lines of the person;
    determining by said processor frequency code values based on the frequency values, wherein the determination of said frequency code values comprises quantizing the selected frequency values; and
    determining by said processor a frequency code which contains a predetermined number of frequency code values.

2. A method as claimed in claim 1, wherein the step of transforming is performed by means of at least one transform from the group of Fourier transforms, Cosinus transforms, Bessel transforms and Hadamard transforms.

3. A method as claimed in claim 1, wherein the frequency values selected are frequency values of predetermined frequencies.

4. A method as claimed in claim 1, comprising selecting by said processor, in the representation of the frequency content, an individual frequency range for the person, said predetermined number of frequency values being selected for frequencies in the selected frequency range.

5. A method as claimed in claim 1, comprising calculating by said processor the absolute value of at least one of the selected frequency values and using the absolute value for determining one of said frequency code values.

6. A method as claimed in claim 1, comprising using by said processor, for at least one of the selected frequency values, the real part of the selected frequency value for determining one of said frequency code values.

7. A method as claimed in claim 1, comprising using by said processor, for at least one of the selected frequency values, the imaginary part of the selected frequency value for determining one of said frequency code values.

8. A method as claimed in claim 1, wherein the frequency content is represented in polar coordinates.

9. A method as claimed in claim 1, comprising storing the frequency code as reference fingerprint data for the person.

10. A method as claimed in claim 9, wherein the reference fingerprint data is stored on a portable data carrier.

11. A method as claimed in claim 9, wherein the reference fingerprint data is stored in a unit as public reference fingerprint data that is allowed to be read from the unit.

12. A method as claimed in claim 9, wherein the reference fingerprint data is stored in a unit as private reference fingerprint data that is not allowed to be read from the unit.

13. A method as claimed in claim 1, wherein the frequency code is compared with at least one reference frequency code which contains a predetermined number of frequency code values.

14. A method as claimed in claim 12, comprising repeating by said processor the comparison between the frequency code and the reference frequency code with a mutual permutation of the frequency code values.

15. A method as claimed in claim 12, further comprising the step of permuting by said processor the frequency code values in either the frequency code or the reference frequency code and repeating the comparison.

16. A method as claimed in claim 12, wherein the frequency code is determined in a first unit and the comparison with the reference frequency code takes place in a second unit.

17. A method as claimed in claim 12, wherein the frequency code is determined in a first unit, the reference frequency code is received from a second unit, the frequency code is compared with the reference frequency code and other data from the image is sent to the second unit based on the result of the comparison between the frequency code and the reference frequency code.

18. A method as claimed in claim 12, wherein the frequency code is compared with a plurality of reference frequency codes for different people, and a small number of said different people is selected for further checking.

19. A computer-readable storage medium storing program instructions that, when executed by a processor, perform a method for use in checking a person's identity, the method comprising the steps of:

transforming at least part of an image of a fingerprint from the person so that a representation of a frequency content in said part of the image is obtained;

selecting, from the representation of the frequency content, a predetermined number of frequency values, wherein said selecting is made for frequencies within a smaller individual-adapted range such that said frequencies correspond to spacing between fingerprint lines of the person;

determining frequency code values based on the frequency values, wherein the determination of said frequency code values comprises quantizing the selected frequency values; and determining a frequency code which contains a predetermined number of frequency code values.

20. A device for use in checking a person's identity, comprising a signal processor which is adapted to:

transform at least part of an image of a fingerprint from the person so that a representation of a frequency content in said part of the image is obtained;

select, from the representation of the frequency content, a predetermined number of frequency values, wherein said selection is made for frequencies within a smaller individual-adapted range such that said frequencies correspond to spacing between fingerprint lines of the person;

the signal processor is further adapted to determine frequency code values based on the frequency values, wherein the determination of said frequency code values comprises quantizing the selected frequency values; and determine a frequency code which contains a predetermined number of frequency code values.

21. A method as claimed in claim 2, comprising selecting, from the representation of the frequency content, a predetermined number of frequency values, and determining said frequency code values based on the frequency values.

22. A method as claimed in claim 9, wherein the reference fingerprint data is stored on a smart card.

23. A method as claimed in claim 10, wherein the reference fingerprint data is stored in a unit as public reference fingerprint data that is allowed to be read from the unit.

24. A method as claimed in claim 10, wherein the reference fingerprint data is stored in a unit as private reference fingerprint data that is not allowed to be read from the unit.

25. A method for use in checking an identity of a person in a unit having a processor, comprising the steps of:

transforming by said processor at least a part of an image of a fingerprint from the person so that a representation of a frequency content in said part of the image is obtained;

selecting by said processor, from the representation of the frequency content, a predetermined number of frequency values, wherein said selecting is made for frequencies within an individual-adapted range such that said frequencies correspond to spacing between fingerprint lines of the person;

determining by said processor frequency code values based on the frequency values; and determining by said processor a frequency code which contains a predetermined number of frequency values.

* * * * *

UNITED STATES PATENT AND TRADEMARK OFFICE
CERTIFICATE OF CORRECTION

PATENT NO. : 7,653,222 B2
APPLICATION NO. : 10/513400
DATED : January 26, 2010
INVENTOR(S) : Björn Nordin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1079 days.

Signed and Sealed this

Twenty-third Day of November, 2010

David J. Kappos
*Director of the United States Patent and Trademark Office*